(12) United States Patent
Oohashi et al.

(10) Patent No.: US 6,703,759 B2
(45) Date of Patent: Mar. 9, 2004

(54) ALTERNATOR

(75) Inventors: Atsushi Oohashi, Tokyo (JP);
Yoshihito Asao, Tokyo (JP); Hirokazu Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/266,625

(22) Filed: Oct. 9, 2002

(65) Prior Publication Data
US 2003/0137213 A1 Jul. 24, 2003

(30) Foreign Application Priority Data

Jan. 21, 2002 (JP) ......................................... 2002-011241

(51) Int. Cl.⁷ .............................. H02K 5/24; H02K 1/22; H02K 19/22
(52) U.S. Cl. ........................................ 310/263; 310/51
(58) Field of Search ................................ 310/263, 261, 310/91, 51, 179; 29/596

(56) References Cited

U.S. PATENT DOCUMENTS

| 4,972,114 A | * | 11/1990 | Frister | ........................ 310/263 |
| 5,708,318 A | * | 1/1998 | Fudono | ........................ 310/263 |
| 6,291,921 B1 | * | 9/2001 | Asao | ............................ 310/263 |
| 6,448,681 B1 | * | 9/2002 | Matsunaga et al. | ......... 310/179 |
| 6,476,535 B1 | * | 11/2002 | Oohashi et al. | ............. 310/263 |
| 6,531,802 B2 | * | 3/2003 | Umeda | ........................ 310/263 |

FOREIGN PATENT DOCUMENTS

| JP | 10-037244 | * | 2/1998 | ............ H02K/1/14 |
| JP | 11-64499 | | 6/1999 | |

* cited by examiner

*Primary Examiner*—Karl Tamai
*Assistant Examiner*—Heba Y. Elkassabgi
(74) *Attorney, Agent, or Firm*—Sughrue Mion, PLLC

(57) ABSTRACT

In an alternator of this invention, a ratio (t1/t2) between a radial thickness (t1) of a tip and a radial thickness (t2) of a root portion is within a range equal to or greater than 0.10 and equal to or less than 0.25, with a ratio (A/B) between a dimension (A) of overlap between a stator core and disk portions when viewed from a radial direction and an axial dimension (B) of the disk portions being within a range equal to or greater than 0.2 and equal to or less than 1.0, and a ratio (Lp/Lc) between an axial length (Lp) of claw-shaped magnetic poles overlapping the stator core when viewed from a radial direction and an axial length (Lc) of the stator core being within a range equal to or greater than 0.7 and equal to or less than 0.9.

10 Claims, 16 Drawing Sheets

ALTERNATOR

BACKGROUND OF THE INVENTION

1. Field of the Invention

The present invention relates to an alternator driven by an internal combustion engine, for example, and relates to an automotive alternator mounted to an automotive vehicle such as a passenger car or a truck, for example.

2. Description of the Related Art

FIG. 12 is a cross section of a conventional automotive alternator, and FIG. 13 is a perspective of a rotor 107 in FIG. 12.

This alternator is provided with: a case 3 constituted by a front bracket 1 and a rear bracket 2 made of aluminum; a shaft 6 disposed inside the case 3, a pulley 4 being secured to a first end portion of the shaft 6; a Lundell-type rotor 107 secured to the shaft 6; fans 105a and 105b secured to first and second end surfaces of the rotor 107; a stator 108 secured to an inner wall surface inside the case 3; slip rings 9 secured to a second end of the shaft 6 for supplying electric current to the rotor 107; a pair of brushes 10 sliding on surfaces of the slip rings 9; a brush holder 11 for accommodating the brushes 10; a rectifier 12 electrically connected to the stator 108 for converting alternating current generated in the stator 108 into direct current; and a regulator 18 fitted onto the brush holder 11, the regulator 18 adjusting the magnitude of the alternating voltage generated in the stator 108.

The rotor 107 is provided with: a rotor coil 13 for generating magnetic flux on passage of an electric current; and a pole core 14 disposed so as to cover the rotor coil 13, magnetic poles being formed in the pole core 14 by the magnetic flux from the rotor coil 13. The pole core 14 is constituted by a first pole core portion 121 and a second pole core portion 122 which are alternately intermeshed with each other. The first pole core portion 121 and the second pole core portion 122 are made of iron, and are constituted by: first and second disk portions 201 and 202 which are surfaces perpendicular to an axis; first and second claw-shaped magnetic poles 123 and 124 having a tapered shape extending axially from the disk portions 201 and 202 so as to face each other; and a cylindrical portion 200 connecting the disk portions 201 and 202 to each other, a circumference of the cylindrical portion 200 being covered by the rotor coil 13.

As shown in FIGS. 14 and 15, on side surfaces of the claw-shaped magnetic poles 123 and 124 each constituting a facing surface between adjacent first and second claw-shaped magnetic poles 123 and 124, values of $\alpha$ and values of $\beta$ are equivalent, where $\alpha$ is an angle formed between the side surface at a tip 123A of a claw-shaped magnetic pole 123 or 124 and a radial line of the claw-shaped magnetic pole 123 or 124, and $\beta$ is an angle formed between the side surface at a root portion 123B of a claw-shaped magnetic poles 123 or 124 and the radial line.

FIG. 16 is a perspective of the stator 108 in FIG. 12, FIG. 17 is a perspective of a stator core 115 in FIG. 12, and FIG. 18 is a partial plan of the stator core 115 in FIG. 17.

The stator 108 is constituted by: a stator core 115 formed by laminating a plurality of steel sheets for passage of a rotating magnetic field from the rotor coil 13; and a three-phase stator winding 116 through which an output current flows. The stator core 115 is constituted by: an annular core back 82; and a plurality of teeth 81 extending radially inward from the core back 82 at a uniform pitch in a circumferential direction. The three-phase stator winding 116 is housed in a total of thirty-six slots 83 formed between adjacent teeth 81. The teeth 81 are constituted by: tip portions 85 projecting in a circumferential direction of the stator 108; and stanchion portions 86 connecting the tip portions 85 and the core back 82. Gaps called opening portions 84 are formed between the tip portions 85 of adjacent teeth 81.

Moreover, this example is a three-phase alternator in which the total number of slots 83 is thirty-six and the total number of claw-shaped magnetic poles 123 and 124 is twelve, the slots 83 being formed at a ratio of one per phase per pole.

In the automotive alternator of the above construction, an electric current is supplied from a battery (not shown) through the brushes 10 and the slip rings 9 to the rotor coil 13, generating a magnetic flux and giving rise to a magnetic field. At the same time, since the pulley 4 is driven by the engine and the rotor 107 is rotated by the shaft 6, a rotating magnetic field is applied to the stator core 115, generating electromotive force in the stator winding 116 and an output current is generated by an external load connected to the automotive alternator.

Now, the magnetic flux A generated by the rotor coil 13 leaves the first pole core portion 121, which is magnetized with north-seeking (N) poles, crosses an air gap between the rotor 107 and the stator 108, and enters the teeth 81 of the stator core 115. This magnetic flux A then passes through the core back 82, and flows from adjacent teeth across the air gap to the second pole core portion 122, which is magnetized with south-seeking (S) poles.

The amount of magnetic flux, which determines the output of the alternator, is itself determined by the magnetomotive force of the rotating magnetic field from the rotor 107 and magnetic resistance of the above magnetic circuit followed by the magnetic flux A. Consequently, if the magnetomotive force is constant, then it is important to shape this magnetic circuit so as to have minimal resistance.

Furthermore, in order to improve the magnetomotive force, it is necessary to increase AT (the field current I multiplied by the number of turns n of conductor wires in the rotor coil 13), but AT is determined by installation space for the rotor coil 13 inside the pole core 114. When the overall size of the rotor 107 is limited, it becomes necessary to reduce the cross-sectional area of the magnetic path through the pole core 114 in exchange for increases in installation space for the rotor coil 13, and as a result the above-mentioned magnetic resistance increases, reducing the amount of magnetic flux passing through the pole core 114 and preventing the magnetomotive force from increasing.

If attempts are made to increase the magnetomotive force by increasing the field current I while keeping the cross-sectional area s of the conductor wires and the number of turns n constant, the temperature of the rotor coil 13 increases due to copper loss in the rotor coil 13, and the resistance of the conductor wires in the rotor coil 13 rises due to the increase in temperature, reducing the field current I and preventing the magnetomotive force from increasing after all.

On the other hand, as shown in FIG. 19, Japanese Patent Laid-Open No. HEI 11-164499 discloses an alternator aimed at increasing magnetomotive force by setting a ratio L1/L2 between an axial length L1 of the stator core 115 and an axial length L2 of the cylindrical portion 200 within a range of 1.25 to 1.75, placing the disk portions 201 and 202 opposite the stator core 115 so that the magnetic flux A flows directly from the disk portions 201 and 202 into the stator core 115, thereby increasing the cross-sectional area of the magnetic path through the pole core 114, and setting a ratio between an outside radius R1 of the claw-shaped magnetic poles 123 and 124 and an outside radius R2 of the cylindrical portion 200 between 0.54 and 0.60, thereby increasing the cross-sectional area of the magnetic path through the cylindrical portion 200.

However, in the automotive alternator according to the above Patent Laid-Open, no consideration at all has been given to the dimensions, shapes, etc., of the claw-shaped magnetic poles 123 and 124, and for example, when the ratio between the radial thickness of the tips 123A of the claw-shaped magnetic poles 123 and 124 and the radial thickness t2 of the root portions of the claw-shaped magnetic poles 123 and 124 is large, in other words, when the thickness of the tips of the claw-shaped magnetic poles 123 and 124 is large, one problem has been that the surface area of the side surfaces of the claw-shaped magnetic poles 123 and 124 which face each other is large even at the tips of the claw-shaped magnetic poles 123 and 124 and the amount of "magnetic flux leakage" increases, that is, a large portion of the magnetic flux flows from those side surfaces to the side surfaces of adjacent claw-shaped magnetic poles 124, reducing effective magnetic flux, and thereby leading to reduced output current.

When the size of the entire rotor 107 is limited, another problem has been that there are constraints on winding a large number of conductor wires with respect to installation space for the rotor coil 13, making the output current low.

SUMMARY OF THE INVENTION

The present invention aims to solve the above problems and an object of the present invention is to provide an alternator in which output current is improved by increasing effective magnetic flux.

In order to achieve the above object, according to one aspect of the present invention, there is provided an alternator wherein: a ratio (t1/t2) between a radial thickness (t1) of a tip of claw-shaped magnetic poles and a radial thickness (t2) of a root portion of the claw-shaped magnetic poles is within a range equal to or greater than 0.10 and equal to or less than 0.25 ($0.10 \leq t1/t2 \leq 0.25$), and a ratio (A/B) between a dimension (A) of overlap between a stator core and disk portions when viewed from a radial direction and an axial dimension (B) of the disk portions is within a range equal to or greater than 0.2 and equal to or less than 1.0 ($0.2 \leq A/B \leq 1.0$).

According to another aspect of the present invention, there is provided an alternator wherein:

a ratio (Lp/Lc) between an axial length (Lp) of claw-shaped magnetic poles overlapping the stator core when viewed from a radial direction and an axial length (Lc) of the stator core is within a range equal to or greater than 0.7 and equal to or less than 0.9 ($0.7 \leq Lp/Lc \leq 0.9$).

DESCRIPTION OF THE PREFERRED EMBODIMENTS

Preferred embodiments of the present invention will now be explained with reference to the drawings, members and portions the same as or corresponding to those in the conventional examples being given identical numbering.

Embodiment 1

Figure 1:
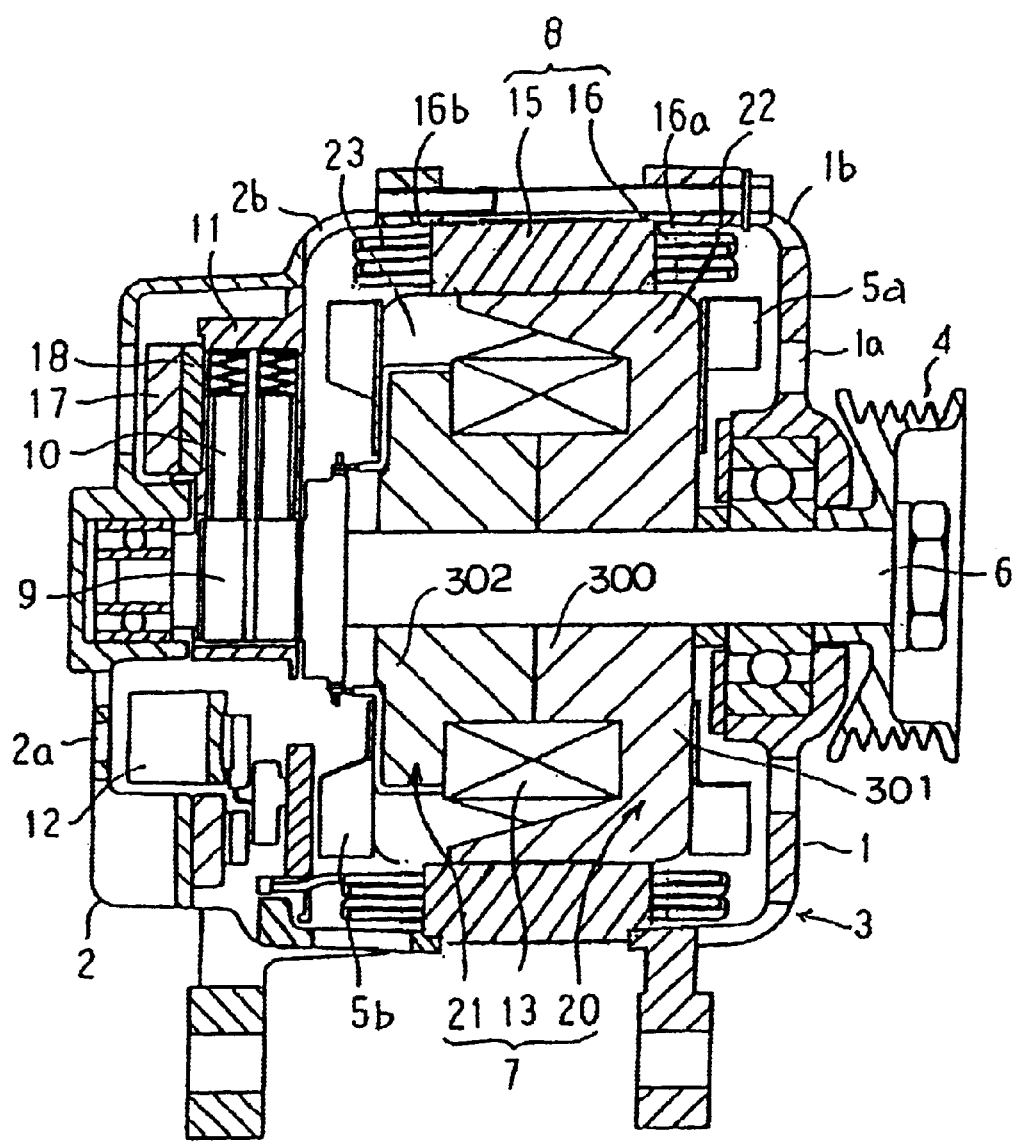
FIG. 1 is a cross section showing an automotive alternator according to Embodiment 1 of the present invention.
Figure 2:
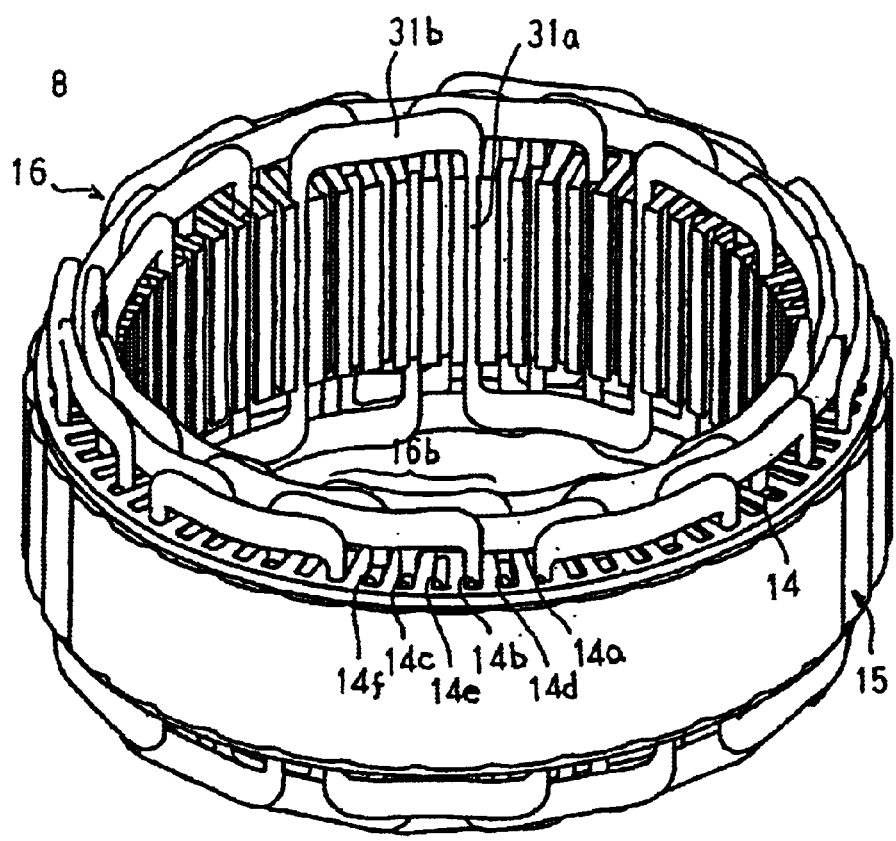
FIG. 2 is a perspective showing a stator in FIG. 1.
Figure 3:
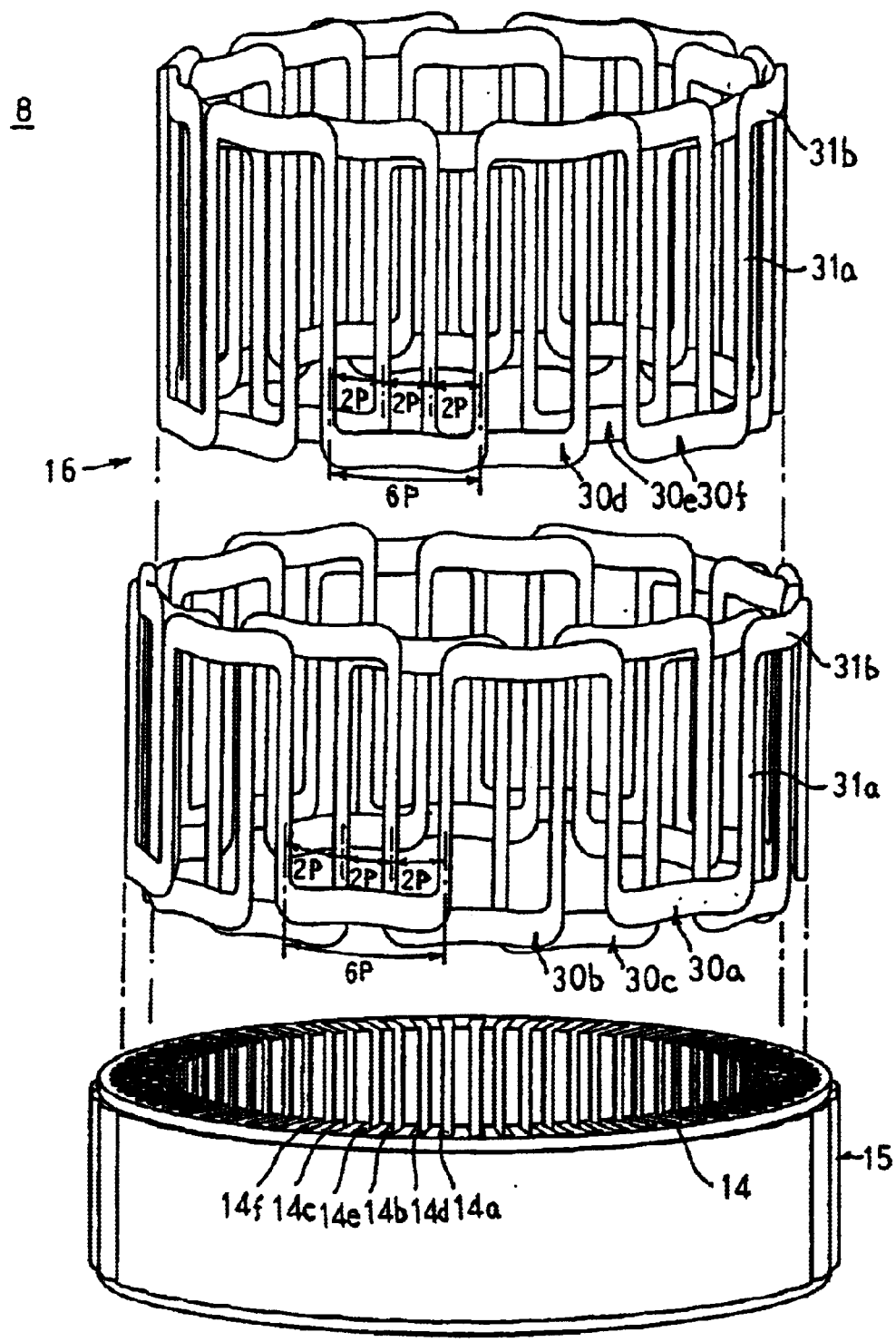
FIG. 3 is an exploded perspective of the stator in FIG. 1.
Figure 4:
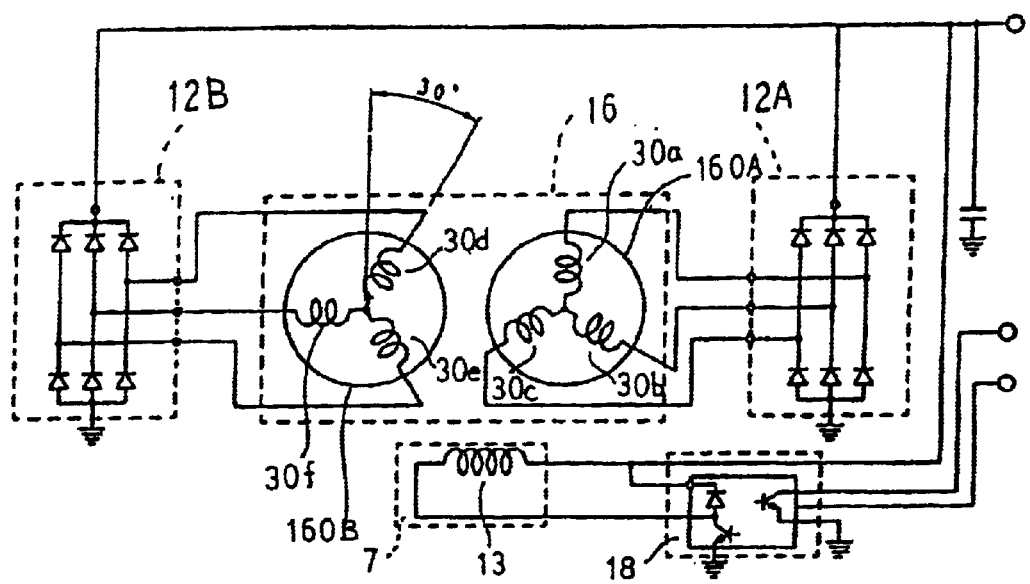
FIG. 4 is a circuit diagram showing an electric circuit in the automotive alternator in FIG. 1.
Figure 5:
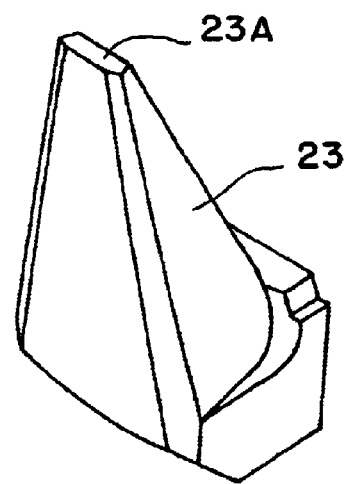
FIG. 5 is a perspective of a claw-shaped magnetic pole from FIG. 1.
Figure 6:
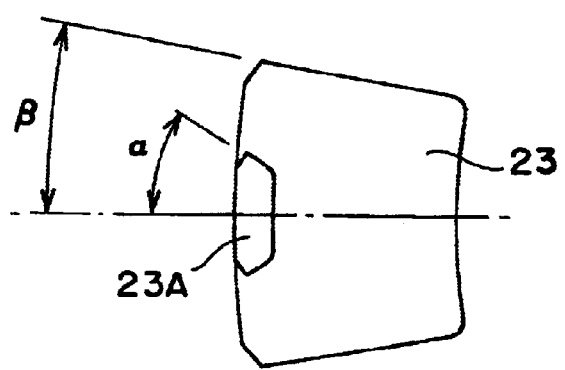
FIG. 6 is a diagram of the claw-shaped magnetic pole in FIG. 5 when viewed from a tip end thereof.

FIG. 1 is a cross section showing an automotive alternator according to Embodiment 1 of the present invention, FIG. 2 is a perspective showing a stator 8 in FIG. 1, FIG. 3 is an exploded perspective of the stator 8 in FIG. 1, FIG. 4 is a circuit diagram showing an electric circuit in the automotive alternator in FIG. 1, FIG. 5 is a perspective of a claw-shaped magnetic pole 23 from FIG. 1, and FIG. 6 is a diagram of the claw-shaped magnetic pole 23 in FIG. 5 when viewed from a tip end thereof.

This automotive alternator is provided with: a case 3 constituted by a front bracket 1 and a rear bracket 2 made of aluminum; a shaft 6 disposed inside the case 3, a pulley 4 being secured to a first end portion of the shaft 6; a Lundell-type rotor 7 secured to the shaft 6; cooling fans 5a and 5b secured to first and second axial end portions of the rotor 7; a stator 8 secured to the case 3 so as to envelop the rotor 7; slip rings 9 secured to a second end portion of the shaft 6 for supplying electric current to the rotor 7; a pair of brushes 10 sliding on surfaces of the slip rings 9; a brush holder 11 for accommodating the brushes 10; rectifiers 12 constituted by first and second rectifiers 12A and 12B electrically connected to the stator 8 for converting alternating current generated in the stator 8 into direct current; and a regulator 18 mounted to a heat sink 17 fitted onto the brush holder 11, the regulator 18 adjusting the magnitude of the alternating voltage generated in the stator 8.

The rotor 7 is provided with: a rotor coil 13 for generating magnetic flux on passage of an electric current; and a pair of first and second pole core portions 20 and 21 disposed so as to cover the rotor coil 13, magnetic poles being formed in the first and second core portions 20 and 21 by the magnetic flux from the rotor coil 13. The first and second pole core portions 20 and 21 are made of iron and have a plurality of first and second claw-shaped magnetic poles 22 and 23, respectively, having a generally trapezoidal outermost diameter surface shape disposed on an outer circumferential edge portion at a uniform angular pitch in a circumferential direction so as to project axially. The first and second pole core portions 20 and 21 are fixed to the shaft 6 facing each other such that the first and second claw-shaped magnetic poles 22 and 23 intermesh.

Inclined surfaces 22a and 23a inclined radially inward starting from outside the first and second end surfaces of the stator core 15 are formed on shoulder portions of the claw-shaped magnetic poles 22 and 23.

Figure 17:
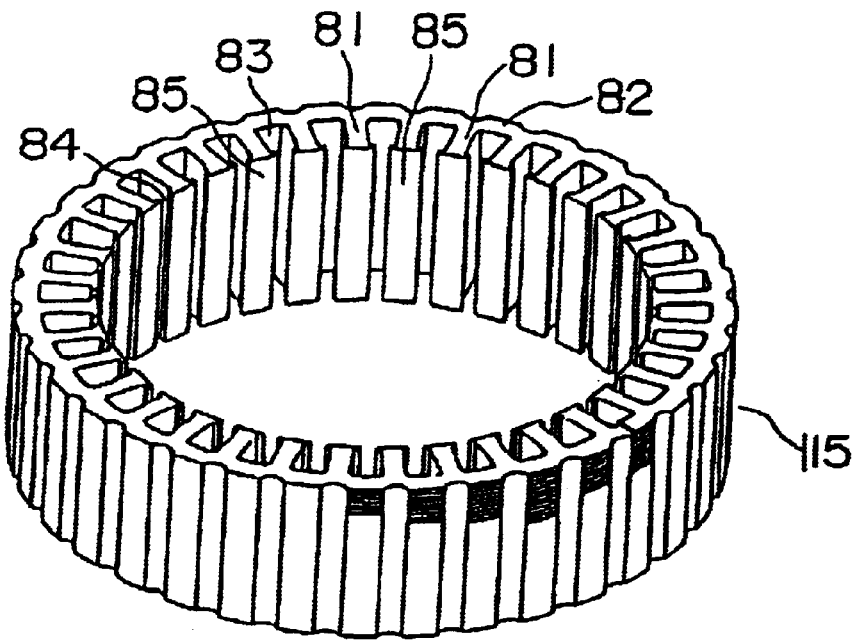
FIG. 17 is a perspective of a stator core in FIG. 12.
Figure 18:
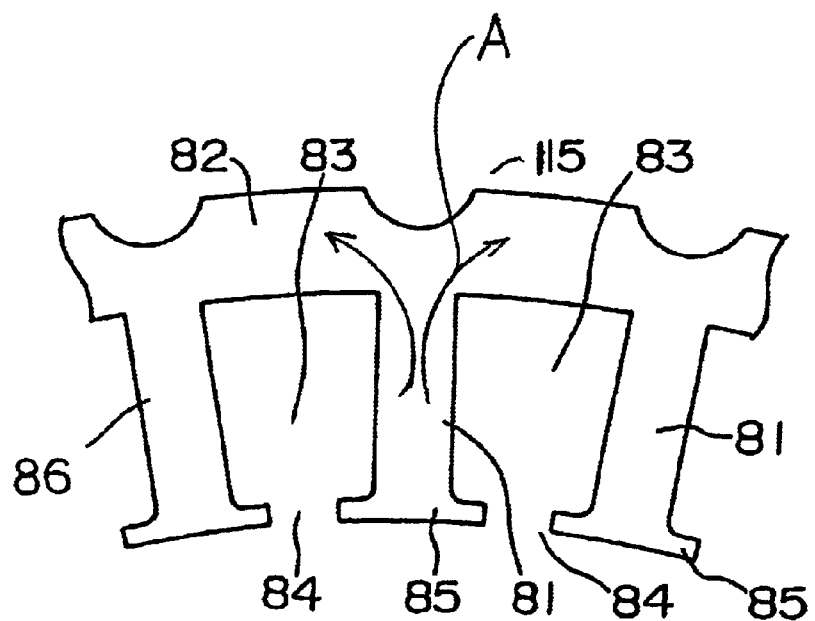
FIG. 18 is a partial plan of the stator core in FIG. 12.
Figure 19:
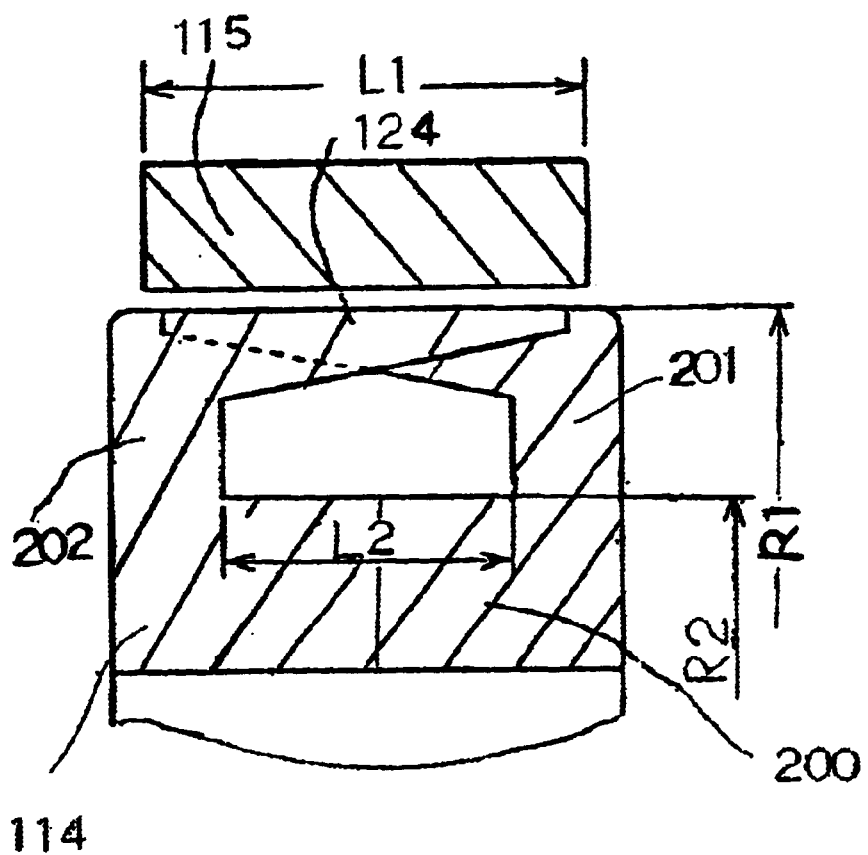
FIG. 19 is an explanatory diagram explaining a positional relationship between a stator core and a pole core.

Whereas values of α and β were equivalent in the conventional construction shown in FIG. 17, α is greater than β (α>β) on side surfaces of the claw-shaped magnetic poles 22 and 23 each constituting a facing surface between adjacent first and second claw-shaped magnetic poles 22 and 23 in this example, where α is an angle formed between the side surface at a tip of a claw-shaped magnetic pole 22 or 23 and a radial line of the claw-shaped magnetic pole 22 or 23, and β is an angle formed between the side surface at a root portion of a claw-shaped magnetic poles 22 or 23 and the radial line, twisted surfaces being formed on the side surfaces constituting the facing surfaces between adjacent first and second claw-shaped magnetic poles 22 and 23.

The stator 8 is constituted by: a cylindrical stator core 15 formed by laminating a magnetic steel sheet; and a three-phase stator winding 16 installed in the stator core 15. The stator 8 is held between the front bracket 1 and the rear bracket 2 such that a uniform air gap is formed between outer circumferential surfaces of the claw-shaped magnetic poles 22 and 23 and an inner circumferential surface of the stator core 15.

Next, a construction of the stator 8 will be explained with reference to FIGS. 2 to 3.

Slots 14 extending axially are disposed in the stator core 15 at a uniform angular pitch (a pitch corresponding to an electrical angle of 30 degrees) in a circumferential direction at a ratio of two per phase per pole. In other words, for twelve claw-shaped magnetic poles 22 and 23 in the rotor 7, seventy-two slots 14 are disposed in the stator core 15 to obtain the three-phase stator winding 16, which is composed of first and second three-phase alternating-current windings 160A and 160B. Here, the slots 14 are arranged in order of an a-phase slot 14a, a d-phase slot 14d, a b-phase slot 14b, an e-phase slot 14e, a c-phase slot 14c, and an f-phase slot 14f repeatedly in a circumferential direction. Moreover, the slots 14 in each phase are disposed at a pitch of six slots.

As shown in FIG. 3, an a-phase winding phase portion 30a is constructed by winding a conductor wire composed of a continuous copper wire having a rectangular cross section coated with an electrical insulator for a predetermined number of winds into a wave-shaped pattern composed of twelve slot-housed portions 31a disposed at a pitch of six slots (6P) in a circumferential direction and linking portions 31b linking together end portions of adjacent pairs of the slot-housed portions 31a alternately at first and second axial ends. The a-phase winding phase portion 30a is installed in the stator core 15 such that the slot-housed portions 31a are housed in the respective a-phase slots 14a disposed at a pitch of six slots. The linking portions 31b linking together the end portions of the adjacent pairs of the slot-housed portions 31a extend circumferentially axially outside the stator core 15, constituting coil ends. Furthermore, b-phase, c-phase, d-phase, e-phase, and f-phase winding phase portions 30b, 30c, 30d, 30e, and 30f are constructed in a similar manner.

The a-phase, b-phase, and c-phase winding phase portions 30a, 30b, and 30c are installed in the stator core 15 so as to be circumferentially offset from each other by a pitch of two slots (2P) and stacked in three layers radially.

Similarly, the f-phase, d-phase, and e-phase winding phase portions 30f, 30d, and 30e are installed in the stator core 15 so as to be circumferentially offset from each other by a pitch of two slots, to be stacked in three layers radially, and to be positioned on an inner circumferential side of the a-phase, b-phase, and c-phase winding phase portions 30a, 30b, and 30c.

Thus, as shown in FIG. 2, a stator 8 is obtained in which the six winding phase portions 30a to 30f are installed in the stator core 15 so as to be stacked radially. Here, the six winding phase portions 30a to 30f are installed in the stator core 15 so as to line up from an outer circumferential side in order of the a-phase winding phase portion 30a, the b-phase winding phase portion 30b, the c-phase winding phase portion 30c, the f-phase winding phase portion 30f, the d-phase winding phase portion 30d, and the e-phase winding phase portion 30e. The coil ends (the linking portions 31b) of the six winding phase portions 30a to 30f constitute front-end and rear-end coil end groups 16a and 16b of the three-phase stator winding 16.

The a-phase, b-phase, and c-phase winding phase portions 30a, 30b, and 30c constructed in this manner are formed into a Y-connection (an alternating-current connection), constituting the first three-phase alternating-current winding 160A, and the d-phase, e-phase, and f-phase winding phase portions 30d, 30e, and 30f are formed into a Y-connection (an alternating-current connection), constituting the second three-phase alternating-current winding 160B. The first and second three-phase alternating-current windings 160A and 160B are connected to the first and second rectifiers 12A and 12B, respectively, constituting the electrical circuit shown in FIG. 4.

Moreover, the a-phase, b-phase, and c-phase winding phase portions 30a, 30b, and 30c are each given a phase difference corresponding to an electrical angle of 120 degrees, and the d-phase, e-phase, and f-phase winding phase portions 30d, 30e, and 30f are each given a phase difference corresponding to an electrical angle of 120 degrees. In addition, the d-phase, e-phase, and f-phase winding phase portions 30d, 30e, and 30f are given a phase difference corresponding to an electrical angle of 30 degrees relative to the a-phase, b-phase, and c-phase winding phase portions 30a, 30b, and 30c, respectively.

In an automotive alternator constructed in this manner, an electric current is supplied from a battery (not shown) through the brushes 10 and the slip rings 9 to the rotor coil 13, generating a magnetic flux. The first claw-shaped magnetic poles 22 on the first pole core portion 20 are magnetized into North-seeking (N) poles by this magnetic flux, and the second claw-shaped magnetic poles 23 on the second pole core portion 21 are magnetized into South-seeking (S) poles.

At the same time, the pulley 4 is driven by an engine and the rotor 7 is rotated by the shaft 6. A rotating magnetic field is applied to the stator core 15 due to the rotation of the rotor 7, generating an electromotive force in the three-phase alternating-current windings 160A and 160B of the three-phase stator winding 16. The alternating electromotive force generated in each of the three-phase alternating-current windings 160A and 160B is converted into direct current by the first and second rectifiers 12A and 12B, respectively, and the magnitudes of the voltages output therefrom are adjusted by the regulator 18. Then, the output from each of the rectifiers 12A and 12B is combined to recharge the battery.

Figure 7:
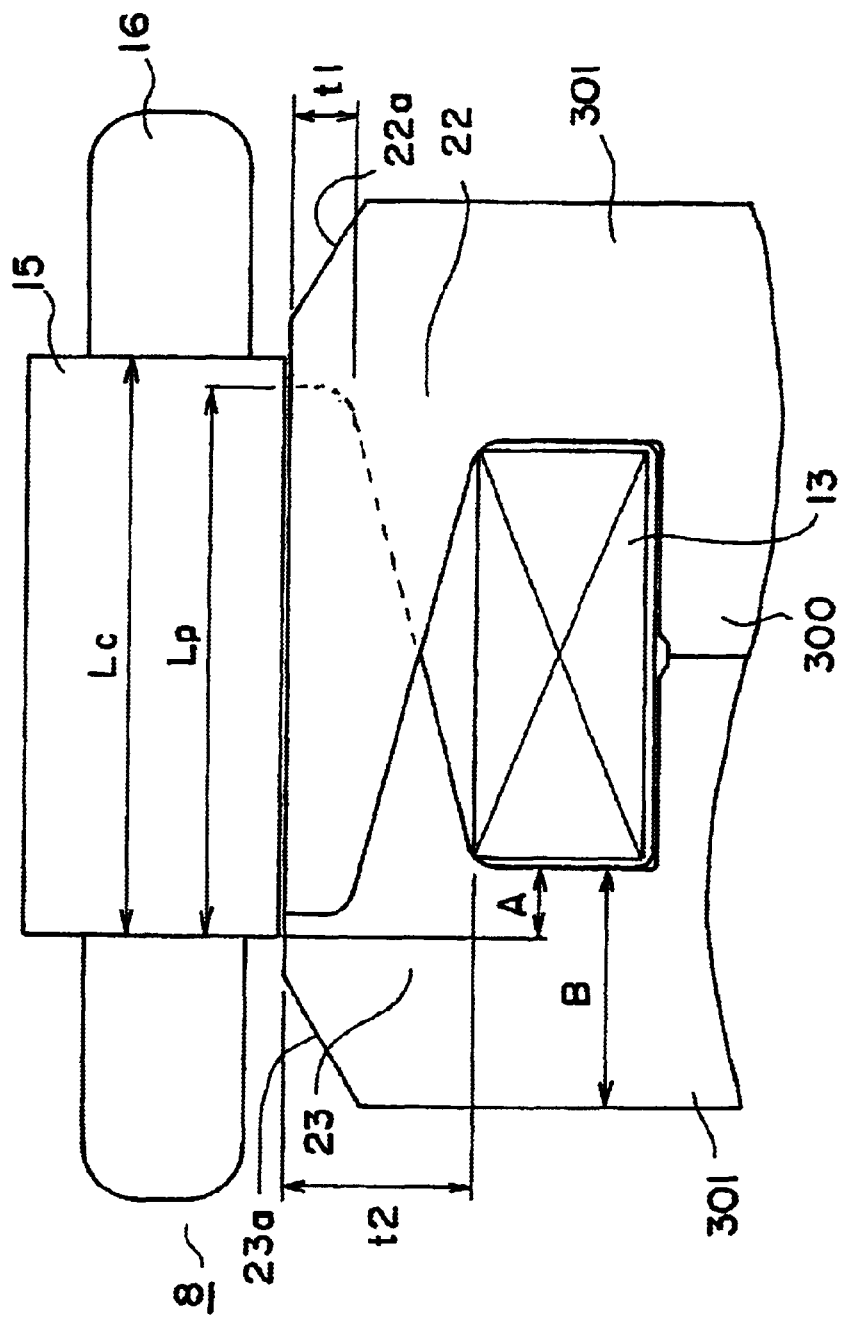
FIG. 7 is a partial enlargement of FIG. 1.

FIG. 7 is a partial enlargement of FIG. 1.

In this drawing, the claw-shaped magnetic poles 22 and 23 in the automotive alternator according to this embodiment are formed such that a value of t1/t2 is kept within a range from 0.10 to 0.25 (0.10≦t1/t2≦0.25) where t1 is the radial thickness of the tips of the claw-shaped magnetic poles 22 and 23 and t2 is the radial thickness of the root portions of the claw-shaped magnetic poles 22 and 23.

The rotor 7 is formed such that a value of A/B is kept within a range from 0.2 to 1.0 (0.2≦A/B≦1.0) where A is a dimension of overlap between the stator core 15 and disk portions 301 of the pole core portions 20 and 21 viewed from the radial direction and B is an axial dimension of the disk portions 301.

In addition, axial length of the claw-shaped magnetic poles 22 and 23 is set such that a value of Lp/Lc is kept within a range from 0.7 to 0.9 (0.7≦Lp/Lc≦0.9) where Lp is an axial length of the claw-shaped magnetic poles 22 and 23 overlapping the stator core 15 viewed from the radial direction and Lc is an axial length of the stator core 15.

Figure 8:
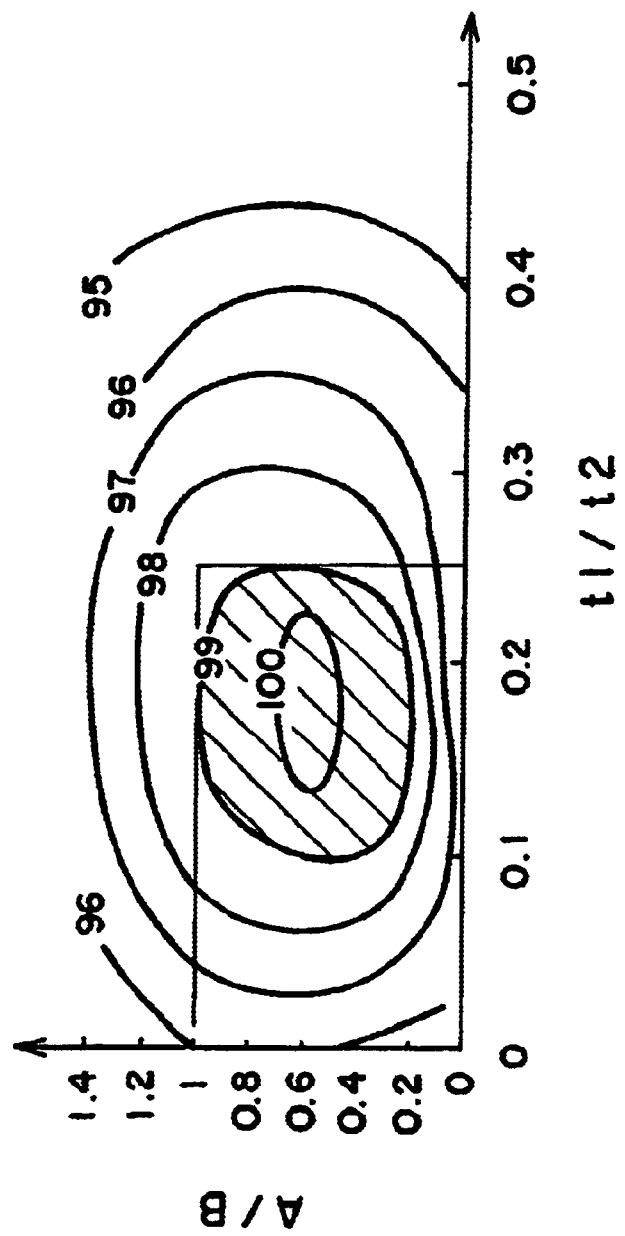
FIG. 8 is a contour map of output current from the automotive alternator according to Embodiment 1.

FIG. 8 is a contour map showing values of output current from alternators which the inventors obtained by experiment, the horizontal axis representing t1/t2 and the vertical axis representing A/B.

As can be seen from this graph, when the value of t1/t2 is within a range 0.10 to 0.25 (0.10☐t1/t2☐0.25), and the value of A/B is within a range 0.2 to 1.0 (0.2≦A/B≦1.0), the value of the output current is equal to or greater than 99 amperes (A), making the value of the output current large.

It is considered that when the value of t1/t2 is less than 0.10, the thickness of the tip portions of the claw-shaped magnetic poles 22 and 23 is too small, increasing magnetic resistance in those portions and thereby reducing the amount of magnetic flux flowing to the stator 8 from the claw-shaped magnetic poles 22 and 23.

It is considered that when the value of t1/t2 is greater than 0.25, the surface area of mutually-facing surfaces of adjacent first and second claw-shaped magnetic poles 22 and 23 increases, increasing the amount of magnetic flux leakage in which the magnetic flux passes directly from the first claw-shaped magnetic poles 22 to the adjacent second claw-shaped magnetic poles 23, thereby reducing the amount of effective magnetic flux and reducing the output current.

It is considered that when the value of A/B is less than 0.2, the value of overlap between the stator core 15 and the disk portions 301 viewed from the radial direction is too small, reducing the amount of magnetic flux entering the stator core 15 from the root portions of the claw-shaped magnetic poles 22 and 23.

It is considered that when the value of A/B is greater than 1.0, the axial length of the stator winding 15 is too large, giving rise to regions in the three-phase stator winding 16 where the magnetic flux is not linked, thereby reducing the output current.

Figure 9:
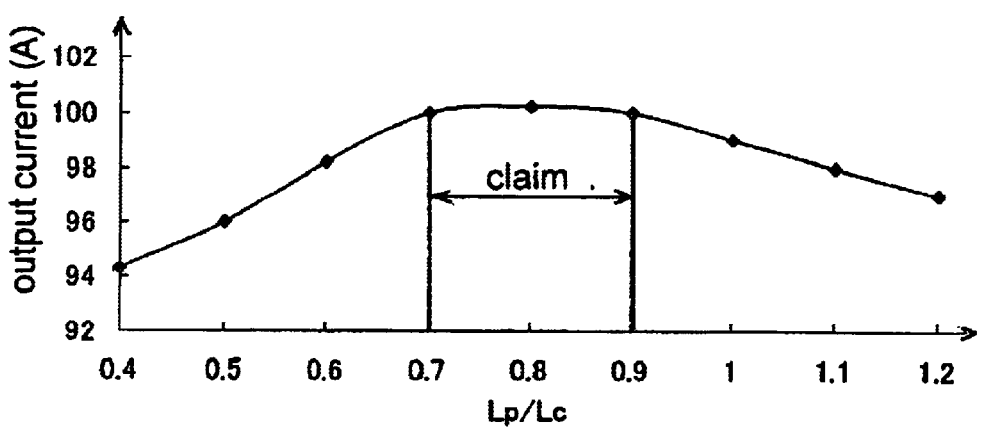
FIG. 9 is a graph showing a relationship between Lp/Lc and output current in the automotive alternator according to Embodiment 1.

FIG. 9 is a graph showing values of output current from alternators corresponding to Lp/Lc which the inventors obtained by experiment.

As can be seen from this graph, the value of the output current is high when Lp/Lc is within a range from 0.7 to 0.9 (0.7≦Lp/Lc≦0.9).

It is considered that when the value of Lp/Lc is less than 0.7, in other words, when the axial length of the claw-shaped magnetic poles 22 and 23 is too short, although magnetic flux flows into the stator core 15 through the claw-shaped magnetic poles 22 and 23, regions arise in the three-phase stator winding 16 where the magnetic flux is not linked, thereby reducing the output current.

It is considered that when the value of Lp/Lc is greater than 0.9, the amount of magnetic flux leakage flowing directly from the first claw-shaped magnetic poles 22 to the adjacent second claw-shaped magnetic poles 23 at the tip portions of the claw-shaped magnetic poles 22 and 23 becomes greater than the magnetic flux flowing around through the stator core 15, thereby reducing the amount of effective magnetic flux and reducing the output current.

In an automotive alternator of the above construction, because inclined surfaces 22a and 23a inclined radially inward starting from outside the first and second end surfaces of the stator core 15 are formed on the shoulder portions of the claw-shaped magnetic poles 22 and 23, magnetic flux from the disk portions 301 flows smoothly into the stator core 15 along the inclined surfaces 22a and 23a, making the total amount of magnetic flux flowing into the stator core 15 larger, thereby making the output current greater.

Because twisted surfaces are formed on the facing surfaces between adjacent first and second claw-shaped magnetic poles 22 and 23, the facing surface area at the tips 23A of the adjacent first and second claw-shaped magnetic poles 22 and 23 is reduced, enabling magnetic flux leakage between the first and second claw-shaped magnetic poles 22 and 23 to be reduced.

Furthermore, the above automotive alternator is a three-phase alternator in which the total number of slots 14 is seventy-two and the total number of claw-shaped magnetic poles 22 and 23 is twelve, the slots 14 being formed at a ratio of two per phase per pole and six slots being interposed between the first and second claw-shaped magnetic poles 22 and 23. The conventional examples are three-phase alternators in which the total number of slots 83 is thirty-six and the total number of claw-shaped magnetic poles 123 and 124 is twelve, three slots being interposed between the first and second claw-shaped magnetic poles 123 and 124. There are twice as many slots 14 in the automotive alternator according to Embodiment 1 by comparison, reducing circumferential dimensions of the tip portions 85 of the teeth 81 proportionately, thereby enabling the amount of magnetic flux leakage flowing between adjacent first and second claw-shaped magnetic poles 22 and 23 through the tip portions 85 of the teeth 81 to be reduced.

Because the conductor wires of the three-phase stator winding 16 have a rectangular cross-sectional shape, the space factor inside the slots 14 is increased, enabling the rotor 7 to be reduced proportionately in size.

Because the thickness of the tip portions in this embodiment is small compared to the conventional claw-shaped magnetic poles 123 and 124 in which t1/t2 is 0.3, for example, weight near the tips of the claw-shaped magnetic poles 22 and 23 is reduced, enabling radially-outward displacement of the claw-shaped magnetic poles 22 and 23 during high-speed rotation to be suppressed proportionately, improving high speed tolerance, and also enabling air gaps between the stator core 15 and the rotor 7 to be reduced, thereby improving output. In addition, it is possible to wind more conductor wire into the rotor coil 13 approaching a central portion of the rotor 7 than on first and second end portions in an axial direction, enabling output to be improved.

Embodiment 2

Figure 10:
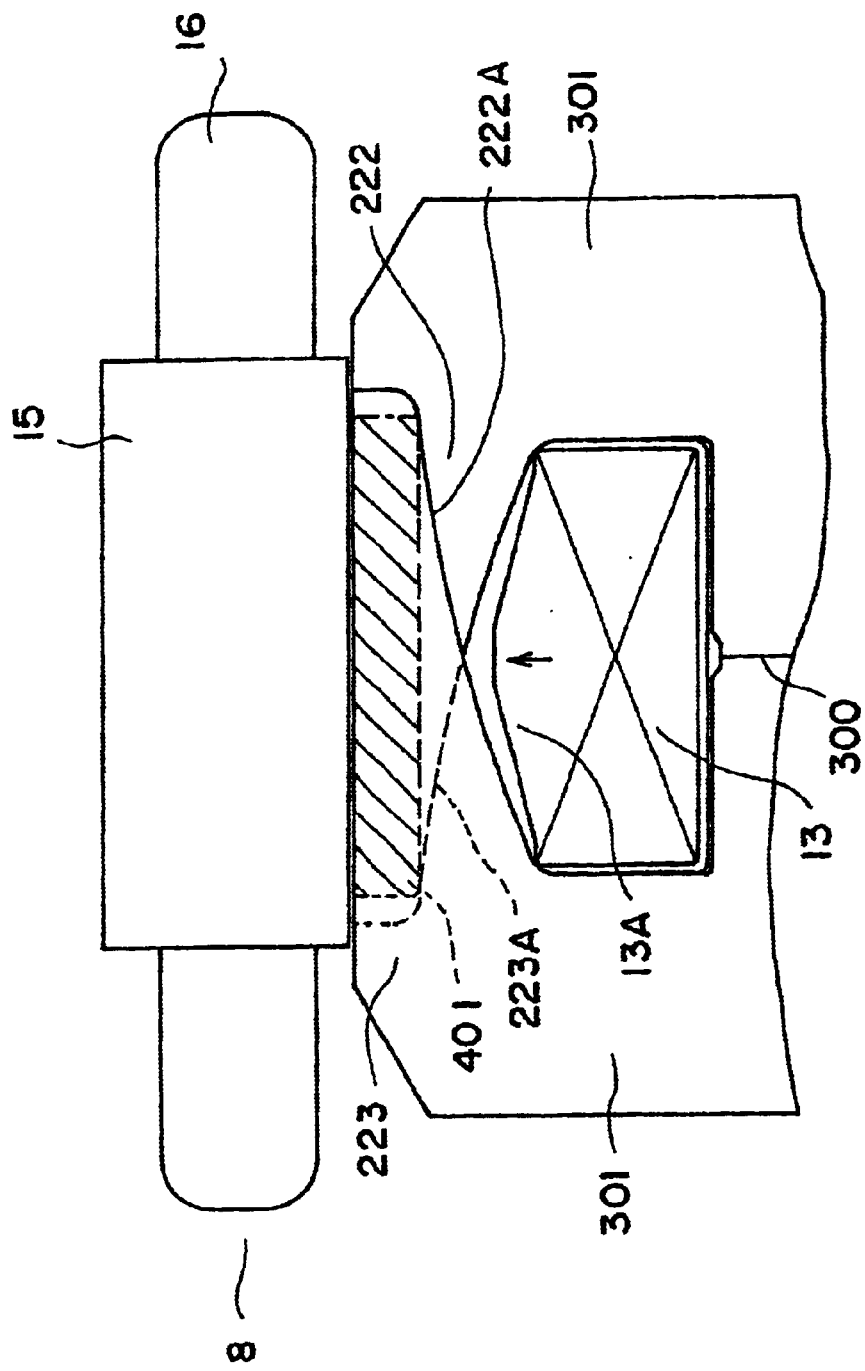
FIG. 10 is a partial cross section of an automotive alternator according to Embodiment 2 of the present invention.

FIG. 10 is a partial cross section of an automotive alternator according to Embodiment 2 of the present invention, coil-facing surfaces 222A and 223A of first and second claw-shaped magnetic poles 222 and 223 near the rotor coil 13 having a curved shape in which an intermediate surface is arched in a radially-outward direction. By adopting this kind of shape, the number of winds of conductor wire on the rotor coil 13 approaching a central portion of the rotor 7 from first and second end portions in an axial direction can be increased, enabling output current to be increased.

Embodiment 3

Figure 11:
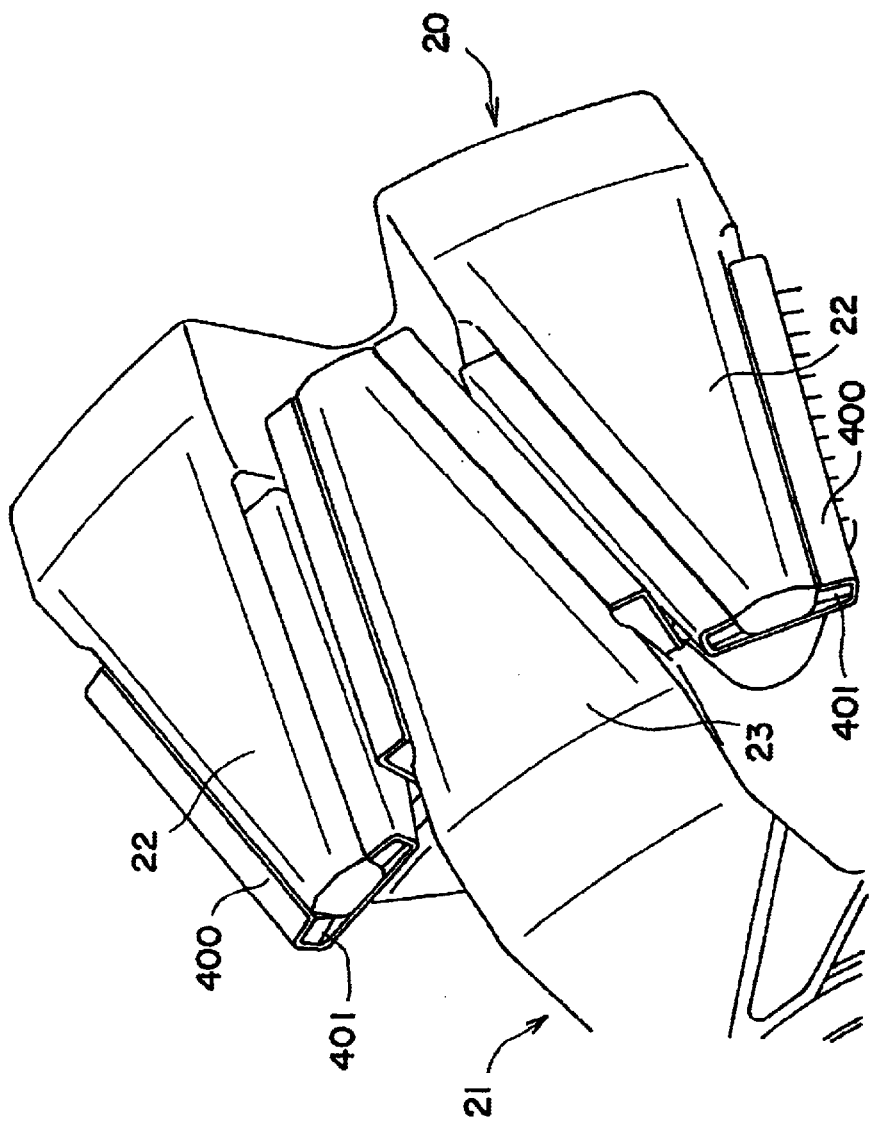
FIG. 11 is a partial perspective of a rotor of an automotive alternator according to Embodiment 3 of the present invention.
Figure 12:
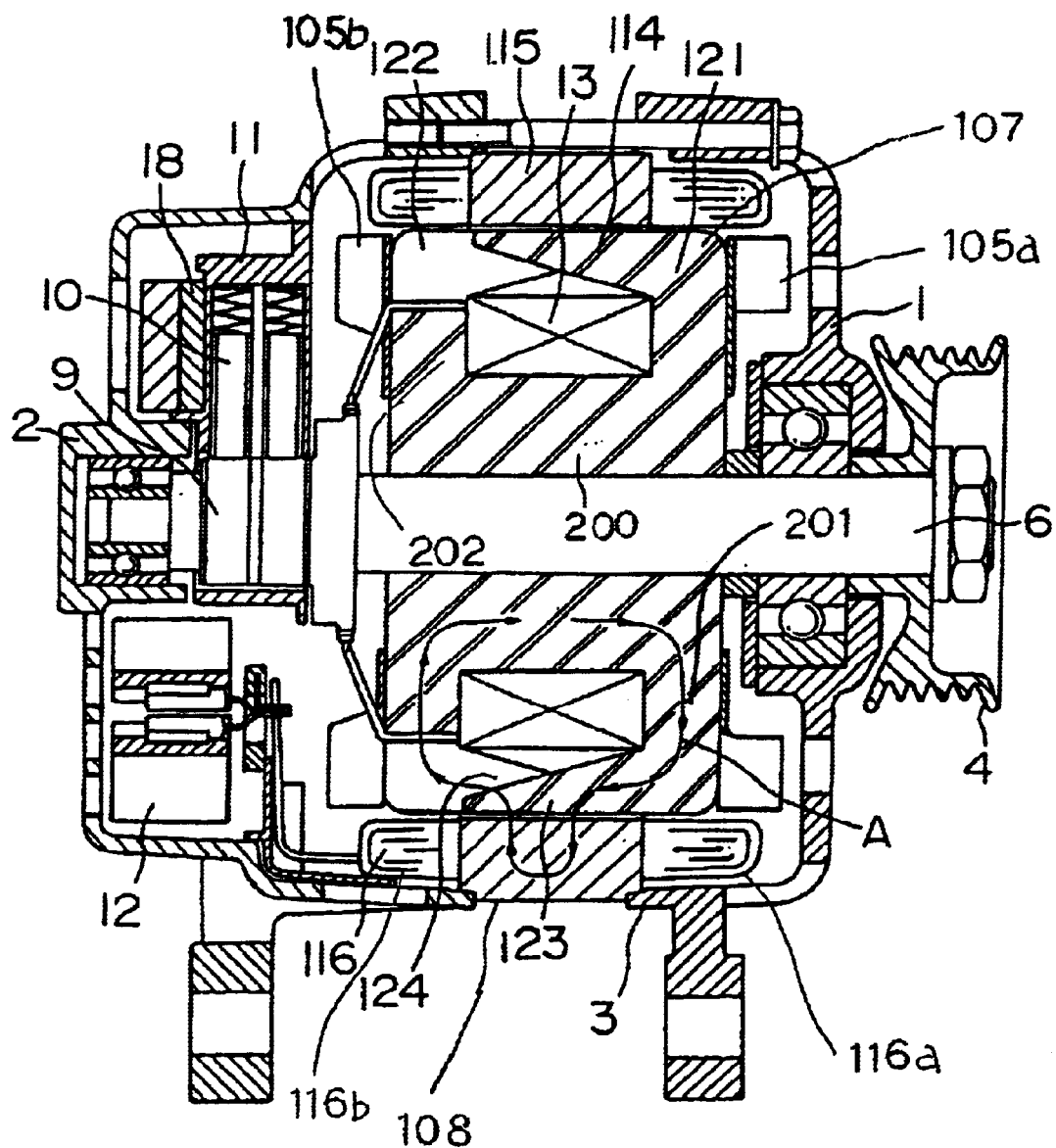
FIG. 12 is a cross section of a conventional automotive alternator.
Figure 13:
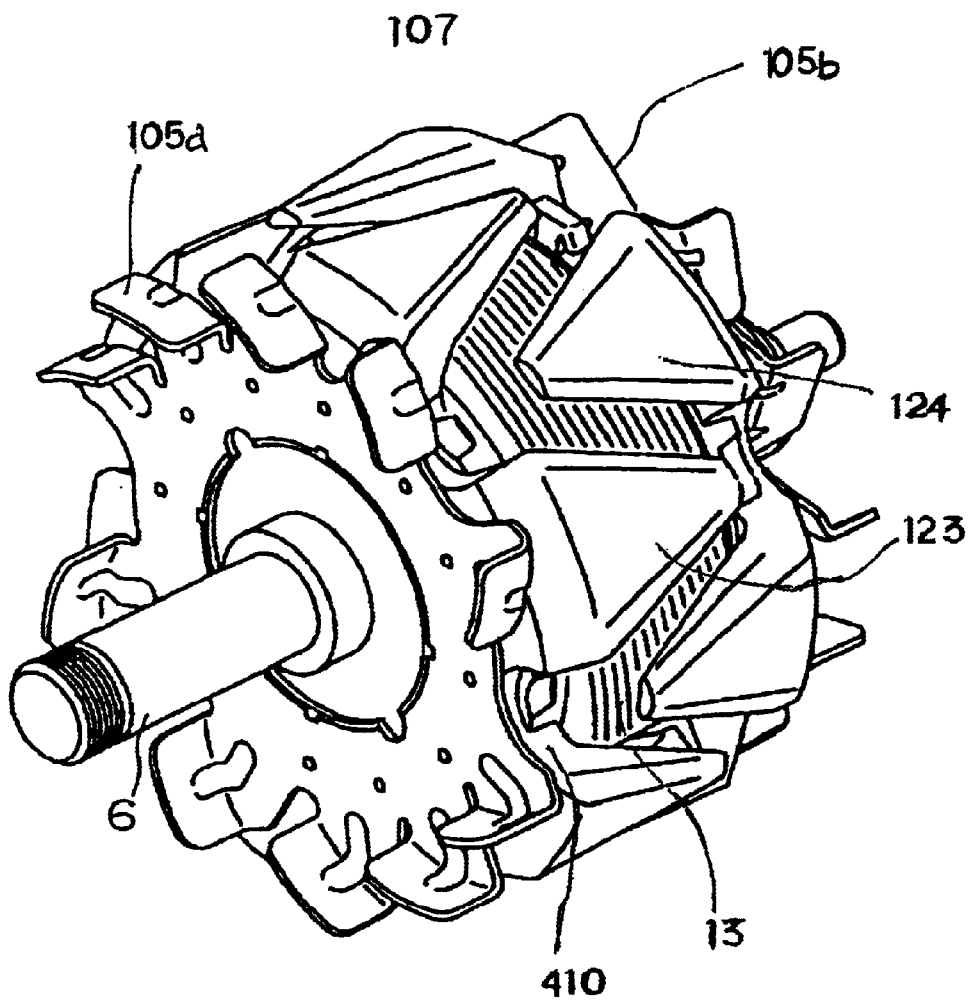
FIG. 13 is a perspective of a rotor in FIG. 12.
Figure 14:
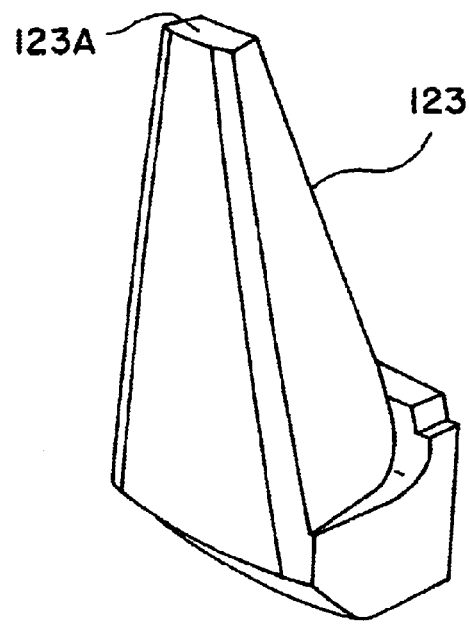
FIG. 14 is a perspective of a claw-shaped magnetic pole from FIG. 12.
Figure 15:
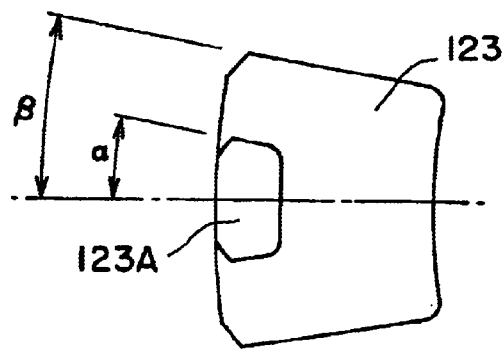
FIG. 15 is a diagram of the claw-shaped magnetic pole in FIG. 14 when viewed from a tip end.
Figure 16:
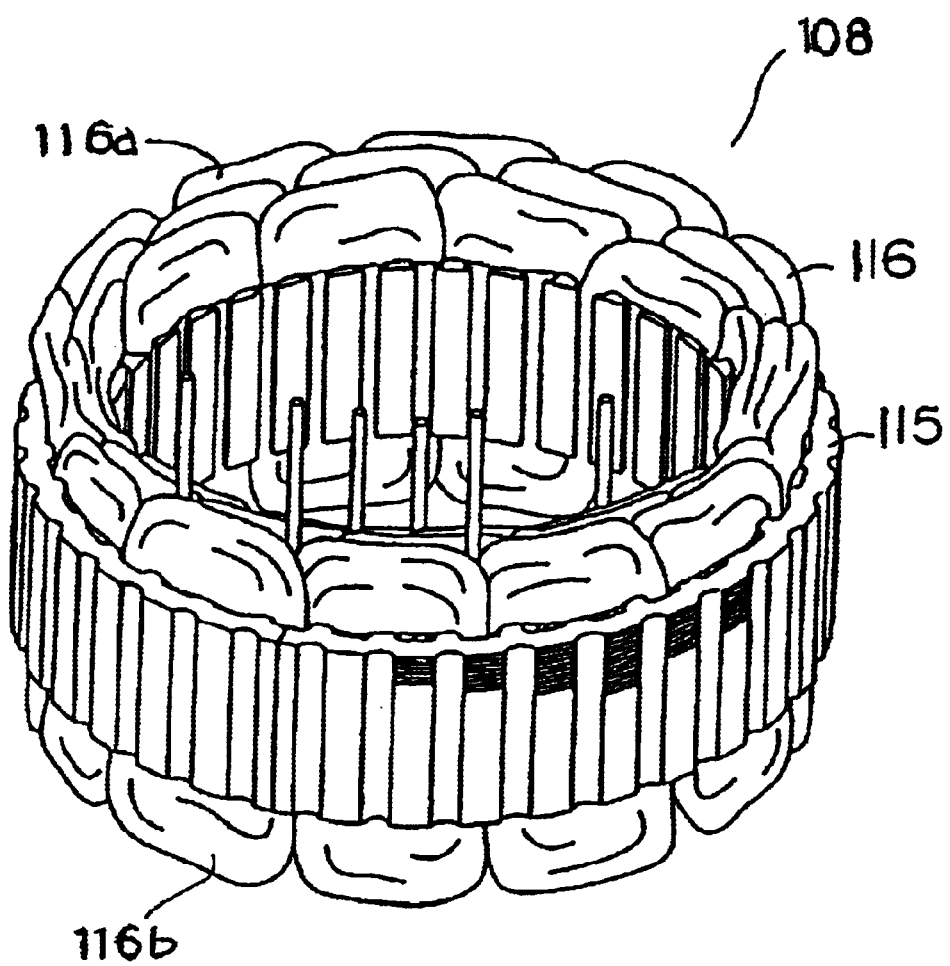
FIG. 16 is a perspective of a stator in FIG. 12.

FIG. 11 is a partial perspective of an automotive alternator according to Embodiment 3 of the present invention.

In this embodiment, support members 400 for supporting first and second claw-shaped magnetic poles 22 and 23 are disposed between adjacent first and second claw-shaped magnetic poles 22 and 23. The support members 400 are trapezoidal, and first and second edge portions thereof are bent into a square bracket "[" shape, permanent magnets 401 being housed in these bent portions.

These permanent magnets 401 are disposed such that sides facing the first and second claw-shaped magnetic poles 22 and 23 have the same polarity as the claw-shaped magnetic poles.

By adopting this kind of construction, the amount of magnetic flux leakage between adjacent first and second claw-shaped magnetic poles 22 and 23 can be reduced, improving the output current.

Moreover, the above embodiments have been explained as they apply to automotive alternators, but the present invention is not limited to automotive use, of course.

As explained above, according to one aspect of the present invention, there is provided an alternator wherein:
a ratio (t1/t2) between a radial thickness (t1) of a tip of claw-shaped magnetic poles and a radial thickness (t2) of a root portion of the claw-shaped magnetic poles is within a range equal to or greater than 0.10 and equal to or less than 0.25 ($0.10 \leq t1/t2 \leq 0.25$), and a ratio (A/B) between a dimension (A) of overlap between a stator core and disk portions when viewed from a radial direction and an axial dimension (B) of the disk portions is within a range equal to or greater than 0.2 and equal to or less than 1.0 ($0.2 \leq A/B \leq 1.0$), increasing the amount of effective magnetic flux, and thereby increasing output.

Furthermore, when compared with conventional constructions, which have a value of t1/t2 in the order of 0.3, weight near tips of the claw-shaped magnetic poles is reduced, enabling radially-outward displacement of the claw-shaped magnetic poles during high-speed rotation to be suppressed proportionately, improving high speed tolerance, and also enabling air gaps between the stator core and a rotor to be reduced, thereby improving output.

According to another aspect of the present invention, there is provided an alternator wherein:
a ratio (Lp/Lc) between an axial length (Lp) of claw-shaped magnetic poles overlapping the stator core when viewed from a radial direction and an axial length (Lc) of the stator core is within a range equal to or greater than 0.7 and equal to or less than 0.9 ($0.7 \leq Lp/Lc \leq 0.9$), increasing the amount of effective magnetic flux, and thereby increasing output.

A ratio (t1/t2) between a radial thickness (t1) of a tip of claw-shaped magnetic poles and a radial thickness (t2) of a root portion of the claw-shaped magnetic poles may be within a range equal to or greater than 0.10 and equal to or less than 0.25 ($0.10 \leq t1/t2 \leq 0.25$), with a ratio (A/B) between a dimension (A) of overlap between the stator core and disk portions when viewed from a radial direction and an axial dimension (B) of the disk portions being within a range equal to or greater than 0.2 and equal to or less than 1.0 ($0.2 \leq A/B \leq 1.0$), and a ratio (Lp/Lc) between an axial length (Lp) of claw-shaped magnetic poles overlapping the stator core when viewed from a radial direction and an axial length (Lc) of the stator core being within a range equal to or greater than 0.7 and equal to or less than 0.9 ($0.7 \leq L/Lc \leq 0.9$), further increasing the amount of effective magnetic flux, and thereby further improving output.

$\alpha$ may be greater than $\beta$ ($\alpha > \beta$) on a side surface of a claw-shaped magnetic pole constituting a facing surface between adjacent claw-shaped magnetic poles, where $\alpha$ is an angle formed between the side surface at a tip of the claw-shaped magnetic pole and a radial line through the claw-shaped magnetic pole and $\beta$ is an angle formed between the side surface at a root portion of the claw-shaped magnetic pole and the radial line, twisted surfaces being formed on the facing surfaces between adjacent claw-shaped magnetic poles, whereby facing surface area at the tip of the adjacent claw-shaped magnetic poles is reduced, reducing magnetic flux leakage between the claw-shaped magnetic poles, thereby increasing the amount of effective magnetic flux and improving output.

An inclined surface inclined radially inward starting from outside an end surface of the stator core may be formed on a shoulder portion of a claw-shaped magnetic pole, whereby magnetic flux from the disk portions flows smoothly into the stator core along the inclined surfaces, making the total amount of magnetic flux flowing into the stator core larger, thereby making the output current greater.

A rotor coil may be constructed such that more conductor wire is wound approaching a central portion of a rotor than on first and second end portions in an axial direction, increasing output.

An intermediate surface of a coil-facing surface of a claw-shaped magnetic pole on a side near the rotor coil may be arched in a radially-outward direction, enabling more conductor wire to be wound approaching the central portion of the rotor than on the first and second end portions in an axial direction, thereby increasing output.

A permanent magnet may be disposed between claw-shaped magnetic poles such that a side of the permanent magnet facing a claw-shaped magnetic pole has identical polarity to the claw-shaped magnetic pole, reducing magnetic flux leakage between the claw-shaped magnetic poles.

Slots may be formed at a ratio of two per phase per pole, enabling the amount of magnetic flux leakage flowing between adjacent claw-shaped magnetic poles through tip portions of teeth defining the slots to be reduced, thereby improving output.

Conductor wires of a stator winding may have a rectangular cross-sectional shape, increasing the space factor inside the slots, thereby enabling the rotor to be reduced proportionately in size.

What is claimed is:
1. An alternator comprising:
a rotor in which north-seeking (N) and south-seeking (S) poles are formed alternately in a direction of rotation; and
a stator surrounding said rotor,
said rotor including:
a rotor coil for generating a magnetic flux on passage of an electric current; and
a pair of pole core portions composed of:
a cylindrical portion onto which said rotor coil is wound;

disk portions extending radially outward from first and second end portions of said cylindrical portion; and a plurality of claw-shaped magnetic poles extending axially from said disk portions so as to cover said rotor coil, said claw-shaped magnetic poles being magnetized with said north-seeking (N) and south-seeking (S) poles by said magnetic flux, and said stator including:

a stator core provided with a plurality of slots formed so as to extend axially and be spaced circumferentially; and a stator winding installed in said stator core by winding a conductor wire into said slots, wherein:

a ratio (t1/t2) between a radial thickness (t1) of a tip of said claw-shaped magnetic poles and a radial thickness (t2) of a root portion of said claw-shaped magnetic poles is within a range equal to or greater than 0.10 and equal to or less than 0.25 (0.10≦t1/t2≦0.25), and a ratio (A/B) between a dimension (A) of overlap between said stator core and said disk portions when viewed from a radial direction and an axial dimension (B) of said disk portions is within a range equal to or greater than 0.2 and equal to or less than 1.0 (0.2≦A/B≦1.0).

2. The alternator according to claim 1, wherein:

a ratio (Lp/Lc) between an axial length (Lp) of said claw-shaped magnetic poles overlapping said stator core when viewed from a radial direction and an axial length (Lc) of said stator core is within a range equal to or greater than 0.7 and equal to or less than 0.9 (0.7≦Lp/Lc≦0.9).

3. The alternator according to claim 1, wherein:

α is greater than β (α>β) on a side surface of a claw-shaped magnetic pole constituting a facing surface between adjacent claw-shaped magnetic poles, where α is an angle formed between said side surface at a tip of said claw-shaped magnetic pole and a radial line through said claw-shaped magnetic pole and β is an angle formed between said side surface at a root portion of said claw-shaped magnetic pole and said radial line.

4. The alternator according to claim 1, wherein:

an inclined surface inclined radially inward starting from outside an end surface of said stator core is formed on a shoulder portion of a claw-shaped magnetic pole.

5. The alternator according to claim 1, wherein:

said rotor coil is constructed such that more conductor wire is wound approaching a central portion of said rotor than on first and second end portions in an axial direction.

6. The alternator according to claim 1, wherein:

an intermediate surface of a coil-facing surface of a claw-shaped magnetic pole on a side near said rotor coil is arched in a radially-outward direction.

7. The alternator according to claim 1, wherein:

a permanent magnet is disposed between claw-shaped magnetic poles such that a side of said permanent magnet facing a claw-shaped magnetic pole has identical polarity to said claw-shaped magnetic pole.

8. The alternator according to claim 1, wherein:

said slots are formed at a ratio of two per phase per pole.

9. The alternator according to claim 1, wherein:

said conductor wires of said stator winding have a rectangular cross-sectional shape.

10. An alternator comprising:

a rotor in which north-seeking (N) and south-seeking (S) poles are formed alternately in a direction of rotation; and a stator surrounding said rotor, said rotor including:

a rotor coil for generating a magnetic flux on passage of an electric current; and a pair of pole core portions composed of:

a cylindrical portion onto which said rotor coil is wound;

disk portions extending radially outward from first and second end portions of said cylindrical portion; and a plurality of claw-shaped magnetic poles extending axially from said disk portions so as to cover said rotor coil, said claw-shaped magnetic poles being magnetized with said north-seeking (N) and south-seeking (S) poles by said magnetic flux, and said stator including:

a stator core provided with a plurality of slots formed so as to extend axially and be spaced circumferentially; and a stator winding installed in said stator core by winding a conductor wire into said slots, wherein:

a ratio (Lp/Lc) between an axial length (Lp) of said claw-shaped magnetic poles overlapping said stator core when viewed from a radial direction and an axial length (Lc) of said stator core is within a range equal to or greater than 0.7 and equal to or less than 0.9 (0.7≦Lp/Lc≦0.9).

* * * * *